(12) United States Patent
Pillkahn

(10) Patent No.: US 6,396,968 B2
(45) Date of Patent: May 28, 2002

(54) OPTICAL SIGNAL TRANSMISSION DEVICE

(75) Inventor: Ulf Pillkahn, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/799,865

(22) Filed: Mar. 2, 2001

(30) Foreign Application Priority Data

Mar. 2, 2000 (DE) .......................... 100 10 235
Feb. 13, 2001 (DE) .......................... 101 06 623

(51) Int. Cl.$^7$ .................................................. G02B 6/12
(52) U.S. Cl. ........................ 385/14; 385/88; 385/89; 385/129; 385/130; 385/131; 385/15
(58) Field of Search ........................ 385/14, 15, 88, 385/89, 92, 93, 129–132, 141

(56) References Cited

U.S. PATENT DOCUMENTS 5,539,848 A * 7/1996 Galloway .................... 385/89
6,243,509 B1 * 6/2001 Chen ........................... 385/14
6,285,808 B1 * 9/2001 Mehlhorn et al. ............ 385/14
6,324,328 B1 * 11/2001 Mehlhorn et al. .......... 385/131

* cited by examiner

Primary Examiner—Brian Healy
Assistant Examiner—Kevin S Wood
(74) Attorney, Agent, or Firm—Laurence A. Greenberg; Werner H. Stemer; Ralph E. Locher

(57) ABSTRACT

A signal transmission plate configuration is described for transmitting optical signals between a number of optical signal output elements and a number of optical signal reception elements. The signal transmission plate configuration contains at least one electric printed circuit board, at least one light-guide layer whose outer surfaces are optically reflecting, and optical signal output elements and optical signal reception elements inserted into the plate configuration with their light output regions and light reception regions, respectively, aligned for outputting or receiving optical signals. The optical signal output elements and the optical signal reception elements can be operated in a wavelength-specific fashion in each case either on their own or in conjunction with transmitting or receiving units assigned to them.

8 Claims, 2 Drawing Sheets

OPTICAL SIGNAL TRANSMISSION DEVICE

BACKGROUND OF THE INVENTION

Field of the Invention

The invention relates to an optical signal transmission device for transmitting optical signals between a number of optical signal output elements and a number of optical signal reception elements. The optical signal transmission device has at least one light-guide device to which the respective optical signal output elements and the respective optical signal reception elements are assigned, and which is combined, if appropriate, together with at least one printed circuit board serving to transmit electric signals to form a signal transmission plate configuration.

An optical signal transmission device of the type specified above is already known (see conference volume on the 3rd workshop titled "Optik in der Rechnertechnik" ["Optics in Computer Engineering"], Dec. 8, 1998, pages 3, 4). In the known optical signal transmission device, the respective light-guide device is formed by an optical waveguide. However, only an optical point-to-point connection from one end to the other end of the respective optical waveguide is thereby rendered possible. Since such optical waveguides are disposed as a rule in a fixed fashion in the respective signal transmission plate device, it follows that no flexible configuration of optical signal output elements and optical signal reception elements is possible. Moreover, as a rule only optical signals of one wavelength are transmitted by such optical waveguides.

SUMMARY OF THE INVENTION

It is accordingly an object of the invention to provide an optical signal transmission device which overcomes the above-mentioned disadvantages of the prior art devices of this general type, which permits a flexible configuration of the optical signal output elements and the optical signal reception elements in a relatively simple way.

With the foregoing and other objects in view there is provided, in accordance with the invention, an optical signal transmission device for transmitting optical signals. The device contains light-guide layers having optically reflecting outer surfaces and formed of a material being at least low-loss for optical waveguides used for optical signal transmission. At least one electric printed circuit board for transmitting electric signals is disposed on one of the light-guide layers. The light-guide layers and the at least one electric printed circuit board form a signal transmission plate configuration. A number of optical signal output elements are disposed in the signal transmission plate configuration and have light output regions each aligned with a respective one of the light-guide layers for outputting the optical signals. A number of optical signal reception elements are disposed in the signal transmission plate configuration and have light reception regions each aligned with a respective one of the light-guide layers for receiving the optical signals. The optical signal output elements and the optical signal reception elements can be operated in a wavelength-specific fashion in each case on their own.

The object indicated above is achieved according to the invention in the case of an optical signal transmission device of the type mentioned at the beginning by virtue of the fact that the respective light-guide device contains a light-guide layer. The light-guide layer is at least low-loss for the optical waveguides used for optical signal transmission and whose outer surfaces are optically reflecting. The optical signal output elements and the optical signal reception elements are inserted into the signal transmission plate configuration such that their light output regions and their light reception regions, respectively, are aligned with the respective optical light-guide layer for outputting or receiving optical signals. The optical signal output elements and the optical signal reception elements can be operated in a wavelength-specific fashion in each case either on their own or in conjunction with transmitting or receiving units assigned to them.

The invention is distinguished by the advantage of creating an optical signal transmission device which is particularly easy to produce and has a more flexible configuration of the optical signal output elements and the optical signal reception elements than is the case with the previously known optical signal transmission device, in the case of which a single optical waveguide is used as the respective light-guide device.

The present invention therefore opens up completely new possibilities in printed circuit board and/or module engineering. The respective material or light-guide layer used as the respective light-guide device permits the transmission of several optical signals, either at the same or different wavelengths, and thereby permits the wavelength-division multiplex (WDM) transmission principle to be used. Thus, it is directly possible, for example, to use an optical signal output device to output optical signals at a multiplicity of wavelengths which are received individually by optical signal reception devices used in a wavelength-specific fashion, or else an optical signal reception device which is to a certain extent a broadband one can receive optical signals output in a plurality of provided optical signal output devices operated in a wavelength-specific fashion. In this case, the individual optical signal output elements and the optical signal reception elements can be disposed in the optical signal transmission device according to the invention at widely disparate points in the light-guide layer forming the respective light-guide device, since the optical signals output by the optical signal output elements propagate inside the light-guide layer by reflection into all regions of this layer, and can thereby be received by the optical signal reception elements disposed at any points inside the light-guide layer. Data rates of up to 10 Gbit/s can be achieved directly in the case of the optical signal transmission in accordance with the invention without external influences being exerted on the signal integrity. Crosstalk, ground bounce and other EMC problems do not arise.

The light-guide layer preferably is formed of polymethyl methacrylate (PMMA), which is a material that is not as fragile as glass but nevertheless has excellent coupling properties.

The optical signal output elements and the optical signal reception elements each have fixing elements by which the relevant optical signal output elements and the optical signal reception elements of the plate configuration are respectively to be disposed in such defined positions that their light output regions and light reception regions, respectively, are aligned with the light-guide layers provided in each case. This measure is attended by the advantage of simplification in the production of an optical transmission device in accordance with the invention. Specifically, the respective fixing element definitively determines the position of the optical signal output elements and the optical signal reception elements, and so adjustability is unnecessary.

It is further advantageous that given the presence of a plurality of light-guide layers in the plate configuration, at least some of the light-guide layers are optically coupled to one another by at least one optical coupling device. As a result, the light-guide layers present in a plate configuration can be optically coupled to one another to a certain extent such that, for example, one light-guide layer can be assigned only optical signal output elements, and another light-guide layer can be assigned only optical signal reception elements. It is possible to proceed in this case such that the optical signal output elements and the optical signal reception elements combined to a certain extent are respectively combined in a unit which is then inserted into the relevant plate configuration such that its light output regions and light reception regions are aligned with the various light-guide layers present.

The abovementioned optical coupling device is preferably formed by a deflecting mirror configuration, specifically by a double prism deflecting mirror configuration, in particular. This entails the advantage of a particularly low structural outlay for implementing the relevant optical coupling device.

In a concomitant feature of the invention, transmitting units are connected to the optical signal output elements, and receiving units are connected to the optical signal reception elements. The optical signal output elements and the optical signal reception elements are operated in a wavelength-specific fashion in each case in conjunction with the transmitting units and the receiving units assigned to them.

Other features which are considered as characteristic for the invention are set forth in the appended claims.

Although the invention is illustrated and described herein as embodied in an optical signal transmission device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
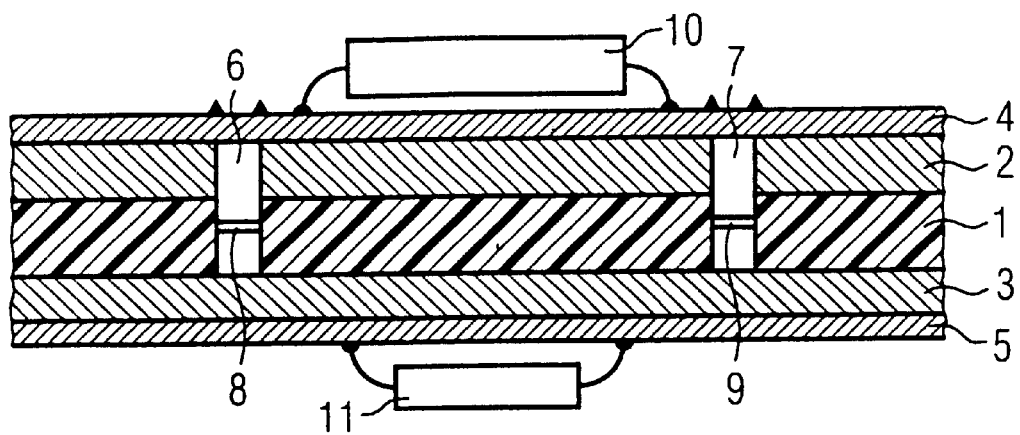
FIG. 1 is a diagrammatic, enlarged sectional view of an exemplary embodiment of an optical signal transmission device in a plate configuration and in accordance with the invention.

In all the figures of the drawing, sub-features and integral parts that correspond to one another bear the same reference symbol in each case. Referring now to the figures of the drawing in detail and first, particularly, to FIG. 1 thereof, there is shown an enlarged schematic sectional view of a plate configuration in which an optical signal transmission device in accordance with the invention is implemented according to one embodiment. In accordance with FIG. 1, the plate configuration has a light-guide layer 1 which is formed of a material which is at least low-loss for optical waveguides to be used in the optical signal transmission device. The relevant light-guide layer 1 is formed here preferably of polymethyl methacrylate (PMMA). Its thickness is between 10 and 100 $\mu$m, for example. The relevant light-guide layer 1 is optically reflecting on its outer surfaces. For this purpose, a refractive index of the layer respectively adjacent to the light-guide layer 1 must be smaller than that of the relevant light-guide layer 1, in order to ensure the light is reflected inside the light-guide layer 1. A maximum angle of reflection of 28° inside the light-guide layer 1 results for a refractive index n2=1.417 of the layer respectively adjoining the light-guide layer 1. However, it is also possible, for example, to achieve this reflection of light by coating the light-guide layer 1 with an appropriate reflecting top layer. The light-guide layer 1 is interposed here between two backing layers 2, 3 which are formed of an electrically non-conducting material and on which conductor layers 4 and 5 are applied, for example Cu conductor layers 4, 5 with a thickness of between, for example, 10 and 50 $\mu$m. The backing layers 2, 3 can have a thickness of 100 $\mu$m in each case, for example. The layers 2, 4 and 3, 5 respectively form an electric conductor plate and can be printed circuit boards.

In accordance with FIG. 1, an optical signal output element 6 and an optical signal reception element 7 are inserted into the light-guide layer 1. The light-guide layer 1 is non-reflecting in these inserted regions. The optical signal output element 6 has a light output region 8 that is aligned with the light-guide layer 1. The optical signal reception element 7 has, in a corresponding way, a light reception region 9 that is likewise aligned with the light-guide layer 1. The optical signal output element 6 can, for example, be a light-emitting diode which is distinguished by developing less heat than a laser, and the optical signal reception element 7 can, for example, be a photodiode whose data are determined by the required transmission rates (1 Gbit/s·1 ns reaction time). However, it is also possible in principle to use other elements for this. As in the case of all other embodiments of the invention still to be explained, however, consideration is also given here, as the respective optical signal output elements, are light emitting diodes which emit light along an edge and are denoted as edge emitting diodes (see the book entitled "Fiber Optic Communication", 4th edition, 1968, Palais, J. C., page 148).

Also indicated in FIG. 1 are two electronic components 10 and 11 which are connected to the Cu conductor layers 4 and 5, for example by being soldered on. As shown in FIG. 1, the two elements 6 and 7 can also be connected electrically to the Cu conductor layer 4 by being soldered on.

Figure 2:
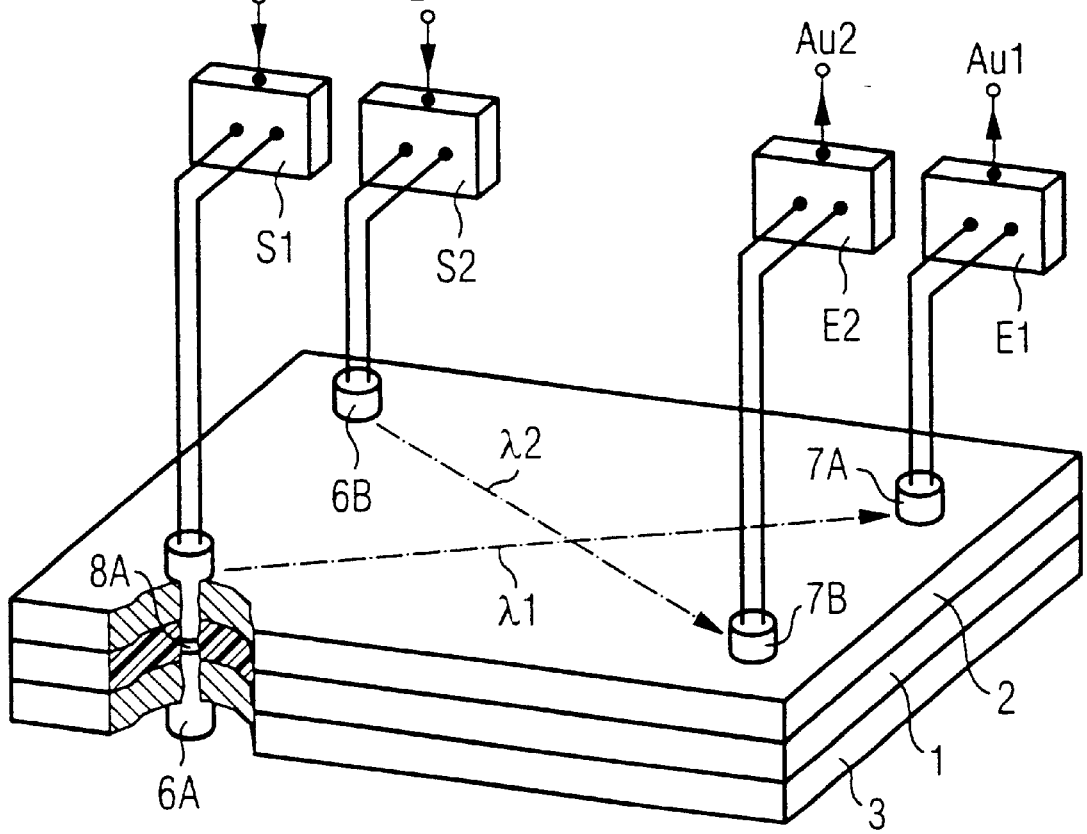
FIG. 2 is an enlarged perspective view of a similar plate configuration.

FIG. 2 shows a plate configuration corresponding to the plate configuration in accordance with FIG. 1 in a schematic fashion in an enlarged perspective illustration. The light-guide layer 1 and the backup layers 2 and 3, which accommodate the light-guide layer 1 between them, of the two printed circuit boards are also illustrated in FIG. 2 as they are shown in FIG. 1. The Cu conductor layers 4, 5 illustrated in FIG. 1 are omitted in FIG. 2 for the sake of simplicity. The light-guide layer 1 is also reflecting here on its outer surfaces.

Two optical signal output elements 6A and 6B, respectively corresponding to the optical signal output element 6 illustrated in FIG. 1, are shown in FIG. 2. Also illustrated are two optical signal reception elements 7A and 7B which correspond to the optical signal reception element 7 illustrated in FIG. 1. The inserted regions of the light-guide layer 1, into which the optical signal output elements and optical signal reception elements 6A, 6B, 7A, 7B are inserted are also not reflecting here. A corresponding statement also holds, moreover, for all further embodiments of the invention still to be explained. A light output region 8A, which is aligned with the light-guide layer 1 and whose thickness may be approximately 1 to 5 µm, is illustrated.

The two optical signal output elements 6A and 6B are connected to outputs of transmitting units S1 and S2, respectively, to which it is possible to feed signals to be transmitted at input terminals Ei1 and Ei2, respectively. The optical signal reception elements 7A and 7B are connected to inputs of receiving units E1 and E2, respectively, which, in response to signals fed to them by the relevant optical signal reception elements 7A, 7B, permit corresponding output signals to be output at output terminals Au1 and Au2, respectively. The input signals occurring at the input terminals Ei1, Ei2, and the output signals occurring at the output terminals Au1, Au2 are respectively in the present case electric signals which are then transmitted in the form of optical signals between the optical signal output elements 6A and 6B, respectively, and the optical signal reception elements 7A and 7B, respectively. The transmission is performed in accordance with FIG. 2 at different optical wavelengths in each case. A wavelength $\lambda 1$ of, for example, 615 nm is used, in this case, between the optical signal output element 6A and the optical signal reception element 7A, while a wavelength $\lambda 2$ of, for example, 750 nm is used between the optical signal output element 6B and the optical signal reception element 7B. The relevant optical signal output elements and optical signal reception elements can either be operated on their own at these wavelengths, or they can be operated in a corresponding wavelength-specific fashion in conjunction with the transmitting and receiving units S1, E1 and S2, E2 assigned to them.

In a departure from the conditions illustrated in FIG. 2, it is also possible to proceed such that, for example, the optical signals are output by the optical signal output element 6A at the wavelengths of $\lambda 1$ and $\lambda 2$, so that the optical signal occurring at wavelength $\lambda 1$ leads via the optical signal reception element 7A and via the associated receiving unit E1 to the output of a corresponding output signal at the output terminal Au1, while the optical signal output at the wavelength $\lambda 2$ of the relevant optical signal output element 6A leads via the optical signal reception element 7B and the receiving unit E2 associated therewith to the output of a corresponding output signal at the output terminal Au2. On the other hand, however, it is also possible, for example, for one of the abovementioned receiving units E1, E2 to be configured such that, together with the optical signal reception element associated 7A, 7B with it, it permits optical signals to be received and evaluated both at the wavelength $\lambda 1$ and at the wavelength $\lambda 2$.

Various possibilities of configuring the optical signal output elements 6 and the optical signal reception elements 7 respectively used are illustrated in an enlarged fashion in FIGS. 3 to 5B. In each case, the relevant optical signal output elements 6 and optical signal reception elements 7 have fixing elements which ensure they are fixed in the respective signal transmission plate configuration such that the respective light output regions 8, 8A and the light reception regions 9, 9A are aligned with the respective light-guide layer without adjustment work.

Figure 3:
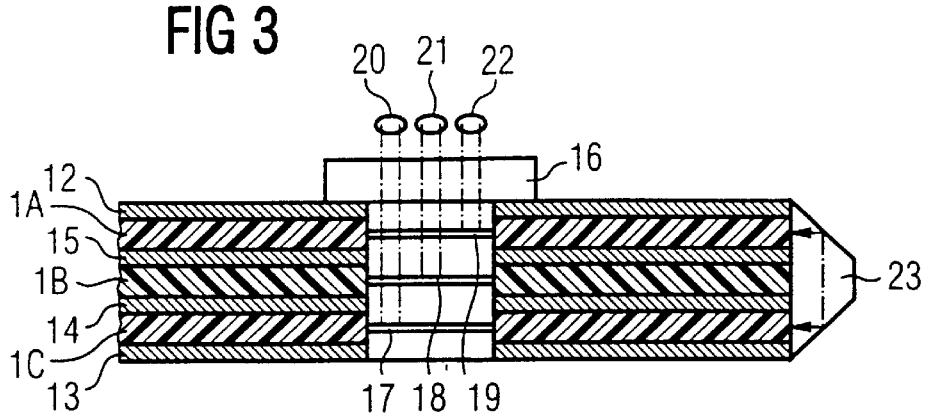
FIGS. 3 to 5B are enlarged, sectional views of various plate configurations with differently configured optical signal output elements and optical signal reception elements.

FIG. 3 shows an enlarged sectional view of the plate configuration containing three light-guide layers 1A, 1B, 1C which are reflecting on their outer surfaces and which are respectively provided between two backing layers 12, 13, 14 and 15, which latter can be individual electric printed circuit boards. Thereby a compact multi-layer plate configuration is formed with the three light-guide layers 1A, 1B and 1C. In accordance with FIG. 3, a light signal output or signal reception element 16 has a cylindrical shaft part and, as a fixing element, a cylindrical head. Individual light output or light reception regions 17, 18 and 19 are accurately fixed in the relevant shaft part. Inserting the relevant optical signal output or optical signal reception element 16 then automatically ensures accurate alignment of the individual light output or light reception regions 17, 18, 19 with the light-guide layers 1A, 1B and 1C for outputting or receiving optical signals.

The light output or light reception regions 17, 18 and 19 provided in the cylindrical shaft part of the optical signal output or optical signal reception element 16 illustrated in FIG. 3 have separate electric connecting wires or connecting lines, which are indicated in FIG. 3 by 20, 21 and 22, respectively. In this case, the relevant regions 17, 18 and 19 do not all need to be formed by light output regions or by light reception regions, rather it is also possible for one or more of these regions 17, 18 and 19 respectively to constitute a light output region, and for the other region or regions respectively to constitute a light reception region. Thus, for example, the regions 17 and 18 can respectively constitute a light output region, and the region 19 can be a light reception region.

In the present case, an optical coupling device 23 which is indicated in FIG. 3 and is formed by a deflecting mirror configuration or by a double prism deflecting mirror configuration can be used to ensure that optical signals output into the light-guide layer 1C by the light output region 17 are introduced into the light-guide layer 1A after double reflection in the coupling device 23, in order to be received by the light reception region 19. It may further be noted here that the implementation of the light deflecting function just discussed by the coupling device or deflecting mirror configuration 23 presupposes that the end faces of the relevant light-guide layers 1A and 1C against which the relevant deflecting mirror configuration 23 bears with its planar side are transparent to the light output by the light output region 17.

Figure 4:
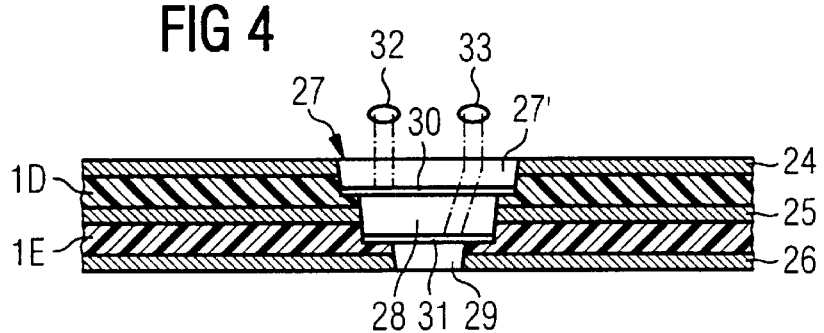

FIG. 4 shows a modification of the principle, to be seen in FIG. 3, of fixing the light signal output elements or light signal reception elements in the signal transmission plate configuration. FIG. 4 provides two light-guide layers 1D and 1E, which are reflecting on their outer surfaces and are provided in each case between two backing plates 24, 25 or 26, which can, for example, likewise be electric printed circuit boards. Therefore, the configuration illustrated in FIG. 4 also constitutes a compact plate configuration containing light-guide layers 1D, 1E and the electric printed circuit boards 24, 25, 26. The optical signal output or optical signal reception element 27 shown in FIG. 4 has three sections 27', 28, 29 in the shape of a conical frustum which are situated one above another and are inserted into corresponding openings in the plate configuration such that the interfaces between the sections 27', 28, on the one hand, and the interfaces 28 and 29, on the other hand, are aligned with the light-guide layers 1D and 1E respectively. In accordance with FIG. 4, light output or light reception regions 30, 31 of the relevant optical signal output element 27 are provided at these interfaces for the corresponding output or reception of optical signals. The light output or light reception regions 30 and 31 are connected by separate electric connecting wires or connecting lines, which are indicated in FIG. 4 by 32 and 33, respectively. The explanations proffered in conjunction with FIG. 3 with reference to the light output or light reception regions also hold in a corresponding way for the embodiment illustrated in FIG. 4.

Figure 5A:
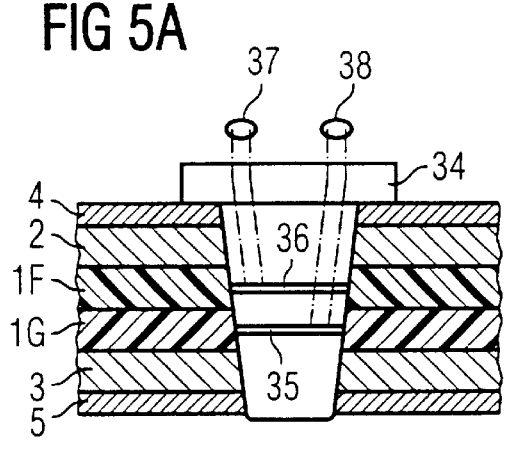

Illustrated in FIG. 5A is a further embodiment of the plate configuration in the case of which the optical signal transmission device in accordance with the invention is applied. The relevant configuration is illustrated on an enlarged scale here, as well. In contrast with the embodiments previously considered, in accordance with FIG. 5A two light-guide layers 1F, 1G whose outer surfaces are reflecting are disposed next to one another. They are interposed between the printed circuit boards 2, 4 and 3, 5, respectively, as they have been explained in conjunction with FIG. 1. An optical signal output or optical signal reception element 34 of a conical configuration, which is configured having a cylindrical fixing element at its top side bearing against the Cu conductor surface 4, is inserted into the plate configuration. The element 34 is inserted into the plate configuration such that its light output or light reception regions 35, 36 are aligned with the two light-guide layers 1F and 1G, respectively. Electric connecting lines or connecting wires, which are indicated in FIG. 5A by 37 and 38, respectively, appertain to the two light output or light reception regions 35, 36.

Figure 5B:
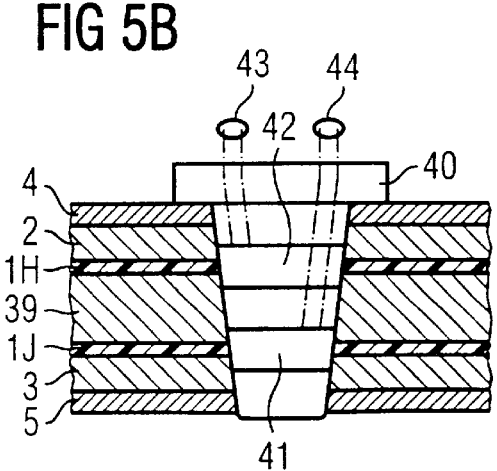

Whereas in the case of the embodiments explained with the aid of FIGS. 1 to 5A the light output or light reception regions of the respectively inserted optical signal output or optical signal reception elements have a lesser width than the respectively used light-guide layers, FIG. 5B shows the opposite relationships, specifically that the light-guide layers are of lesser thickness than the light output or light reception regions of the optical signal output or optical signal reception elements used. In accordance with FIG. 5B, two light-guide layers 1H and 1J are provided which are reflecting on their outer surfaces and between which an insulating backing layer 39 may be provided and on whose outer surfaces the electric printed-circuit boards 2, 4 and 3, 5, respectively, are provided which correspond to the electric printed-circuit boards, denoted in the same way, in accordance with FIG. 1. Inserted into the plate configuration is an optical signal output or optical signal reception element 40 which is of a conical configuration and configured as a cylindrical fixing element on its top side bearing against the Cu conductor surface 4. The relevant optical signal output or optical signal reception element 40 has two relatively wide light output or light reception regions 41, 42 which are positioned by the fixed mounting of the relevant optical signal output or optical signal reception element 40 in the plate configuration illustrated such that the light-guide layers 1H and 1J, respectively, are exactly aligned with them.

The light output or light reception regions 41, 42 likewise have separate connecting wires or connecting lines, which are denoted by 43 and 44, respectively, in FIG. 5B. Conditions such as have been explained in conjunction with FIG. 3 also hold with reference to the configuration illustrated in FIG. 5B with regard to the optical signal output or optical signal reception elements used there.

It may further be noted with regard to the embodiments illustrated in FIGS. 5A and 5B that it is possible to manage in principle even without the cylindrical fixing elements in the case of these embodiments by using the conical shaft parts of the optical signal output or optical signal reception elements as fixing elements.

I claim:

1. An optical signal transmission device for transmitting optical signals, comprising:
    light-guide layers having optically reflecting outer surfaces and formed of a material being at least low-loss for optical waveguides used for optical signal transmission;
    at least one electric printed circuit board for transmitting electric signals disposed on one of said light-guide layers, said light-guide layers and said at least one electric printed circuit board form a signal transmission plate configuration;
    a number of optical signal output elements disposed in said signal transmission plate configuration and having light output regions each aligned with a respective one of said light-guide layers for outputting the optical signals; and
    a number of optical signal reception elements disposed in said signal transmission plate configuration and having light reception regions each aligned with a respective one of said light-guide layers for receiving the optical signals, said optical signal output elements and said optical signal reception elements can be operated in a wavelength-specific fashion in each case on their own.

2. The optical transmission device according to claim 1, wherein said light-guide layers are formed of polymethyl methacrylate.

3. The optical transmission device according to claim 1, wherein said optical signal output elements and said optical signal reception elements in each case have fixing elements by which said optical signal output elements and said optical signal reception elements are disposed in said signal transmission plate configuration in such defined positions in each case that said light output regions and said light reception regions, respectively, are aligned with said respective ones of said light-guide layers provided in each case.

4. The optical transmission device according to claim 1, including at least one optical coupling device optically coupling at least some of said light-guide layers to one another.

5. The optical transmission device according to claim 4, wherein said at least one optical coupling device is a deflecting mirror configuration.

6. The optical transmission device according to claim 4, wherein said at least one optical coupling device is a double prism deflecting mirror configuration.

7. The optical transmission device according to claim 6, including:
    transmitting units connected to said optical signal output elements; and
    receiving units connected to said optical signal reception elements, said optical signal output elements and said optical signal reception elements operated in the wavelength-specific fashion in each case in conjunction with said transmitting units and said receiving units assigned to them.

8. An optical signal transmission device for transmitting optical signals, comprising:
    a light-guide layer having optically reflecting outer surfaces and formed of a material being at least low-loss for optical waveguides used for optical signal transmission;
    at least one electric printed circuit board for transmitting electric signals disposed on said light-guide layer, said light-guide layer and said at least one electric printed circuit board form a signal transmission plate configuration;
    an optical signal output element disposed in said signal transmission plate configuration and having a light output region aligned with said light-guide layer for outputting the optical signals; and
    an optical signal reception element disposed in said signal transmission plate configuration and having a light reception region aligned with said light-guide layer for receiving the optical signals, said optical signal output element and said optical signal reception element can be operated in a wavelength-specific fashion in each case on their own.

* * * * *